United States Patent [19]
Dupont

[11] Patent Number: 6,145,433
[45] Date of Patent: *Nov. 14, 2000

[54] APPARATUS HAVING MEMBERS FOR PREPARING AN EXTRUDED FOOD PRODUCT AND PARTICULARLY A MULTI-COLORED PRODUCT

[75] Inventor: Christophe Dupont, Salouel, France

[73] Assignee: Nestec S.A., Vevey, Switzerland

[*] Notice: This patent is subject to a terminal disclaimer.

[21] Appl. No.: 09/208,531

[22] Filed: Dec. 9, 1998

Related U.S. Application Data

[62] Division of application No. 09/010,358, Jan. 21, 1998, Pat. No. 6,001,402.

[30] Foreign Application Priority Data

Jan. 22, 1997 [EP] European Pat. Off. .............. 97200167

[51] Int. Cl.⁷ ...................................................... A47J 37/00
[52] U.S. Cl. .......................... 99/353; 99/443 D; 99/477; 426/249; 425/183
[58] Field of Search ..................................... 426/519, 511, 426/249, 516; 99/348, 477, 353, 355, 443 C, 386; 425/183

[56] References Cited

U.S. PATENT DOCUMENTS

| | | | |
|---|---|---|---|
| 3,903,315 | 9/1975 | Giles et al. | 426/388 |
| 4,044,661 | 8/1977 | Balaz | 99/355 |
| 4,235,935 | 11/1980 | Bone et al. | 426/249 |
| 4,310,558 | 1/1982 | Nahm, Jr. | 426/98 |
| 4,358,468 | 11/1982 | Dolan et al. | 426/250 |
| 4,454,804 | 6/1984 | McCulloch | 99/348 |
| 5,019,404 | 5/1991 | Meisner | 426/249 |
| 5,165,949 | 11/1992 | Farnsworth et al. | 426/496 |
| 5,458,900 | 10/1995 | Rubio et al. | 426/512 |
| 5,538,748 | 7/1996 | Boatman et al. | 426/516 |
| 6,001,402 | 12/1999 | Dupont | 426/249 |

FOREIGN PATENT DOCUMENTS

0265740A2   5/1988   European Pat. Off. ........ A23L 1/317

OTHER PUBLICATIONS

US PTO translation of Togum S.A., German Patent Application No. DE 37 30 496 A1 (including application drawing Figures) (1988).

*Primary Examiner*—Milton Cano
*Assistant Examiner*—Sherry A. Dauerman
*Attorney, Agent, or Firm*—Vogt & O'Donnell, LLP

[57] ABSTRACT

Apparatus for preparing an extruded food product, particularly a multi-colored food product, includes a mixer for mixing food materials for obtaining a base material mixture which is emulsifiable and includes an emulsifying device for emulsifying the base material mixture to obtain an emulsified product, and tanks are provided for supplying different solutions, particularly differently colored food-coloring solutions, to the emulsifying device for inclusion in the emulsified product. A valve is positioned for distributing emulsified product to a plurality of piping lines which are arranged in parallel and which are connected to mechanical extruders in a one-to-one relation so that when emulsified product is distributed to one emulsified product transport piping line, emulsified product is not delivered to another of the piping lines so that emulsified product is distributed to different product transport piping lines which feed different mechanical extruders for separately extruding products which differ one from another. For further treating product extruded by the extruders, a steam oven is provided for cooking the product, and a conveyor belt is positioned to receive the extruded product and transport it through the steam oven for cooking.

15 Claims, 1 Drawing Sheet

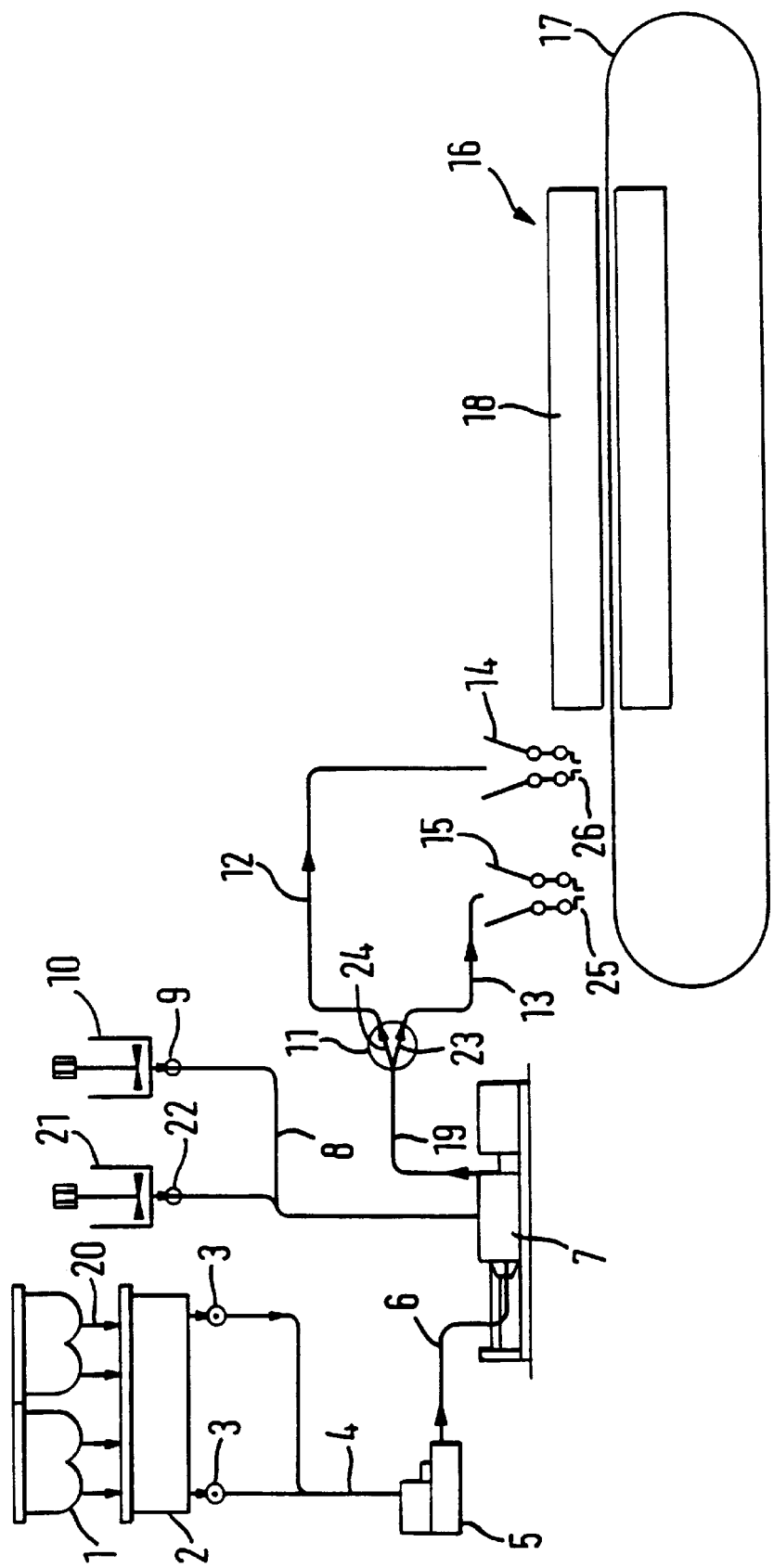

APPARATUS HAVING MEMBERS FOR PREPARING AN EXTRUDED FOOD PRODUCT AND PARTICULARLY A MULTI-COLORED PRODUCT

CROSS REFERENCE TO RELATED APPLICATION

This is a divisional application of application Ser. No. 09/010,358 filed Jan. 21, 1998 U.S. Pat. No. 6,001,402.

BACKGROUND OF THE INVENTION

The present invention relates to apparatus for preparing extruded food products, particularly multi-coloured products, and more particularly to apparatus having members which provided for ingredient mixing, for mixture emulsification and for extrusion of products which differ, particularly as in color, one from another.

European Patent Application No. 0265740 already relates to a process for preparing pieces, in which a meat emulsion is prepared by subjecting it to a heat treatment allowing coagulation of the proteins present. To obtain the coagulation, a certain content of proteins is required, which increases the cost of the starting raw materials.

SUMMARY OF THE INVENTION

The object of the present invention is to provide an apparatus and a process for preparing pieces in which the cost of the raw material used is reduced, while still maintaining a high quality of the pieces manufactured, involving, in particular, their texture.

To that end, one aspect of the present invention provides an apparatus for preparing an extruded food product which comprises:

a mixer for mixing food materials for obtaining a base mixture which is emulsifiable;

a pump and an emulsifying device connected with the mixer in series by piping lines so that the pump is arranged between the mixer and emulsifying device so that the pump pumps base mixture received from the mixer to the emulsifying device for emulsifying the base mixture to prepare an emulsified product and wherein the emulsifying device further has means for solutions, particularly food-colouring solutions, to enter into the device for inclusion in the emulsified product;

tanks and piping lines for supplying the solutions, particularly solutions which differ one from another, particularly in colour, to the emulsifying device;

a distribution valve for distributing emulsified product from the emulsifying device to parallel piping lines which feed different mechanical extruders for separately extruding products which differ one from another, particularly products which differ in colour; and a steam oven having a conveyor belt onto which the extruded products drop.

Further, the present invention also provides a process for preparing continuously moist pieces having at least two different colours (multi-coloured product pieces), in which:

the raw materials, such as meat, meat by-products, cereals, water and fat, are mixed in order to obtain a base mixture;

the base mixture is taken into a pump in order to transport it to an emulsifying device;

the mixture is emulsified in the emulsifying device, which includes means for delivering a colouring solution;

another colouring solution is added successively and periodically, each time for a time t, to the emulsified mixture;

the paste coloured with each colorant is taken alternately and continuously to a distribution valve;

the paste coloured with a first colorant is delivered from the valve to a first mechanical extruder and then the paste coloured with a second colorant is delivered to a second mechanical extruder, and so on, up to n colorants;

the paste is extruded simultaneously from the various mechanical extruders onto the conveyor belt of a steam oven, while the first mechanical extruder is being charged with the paste coloured with the first colorant, and then the second mechanical extruder is charged, and so on, the time to empty each mechanical extruder being at least equal to (n−1)t; and the extruded pieces are cooked in a steam oven.

Apart from the possibility according to the process of the invention of manufacturing lower-cost pieces, it is also possible to work in a continuous fashion, with a throughput which may be as much as eight tons per hour and outputting pieces having various colours, using a single manufacturing line.

DETAILED DESCRIPTION OF THE INVENTION

In the present description, all the percentages are by weight.

In the carrying out the process of the present invention, among the raw materials used, meat or meat by-products are all the fleshy parts of slaughtered hot-blooded animals, in the fresh state or preserved by a suitable treatment, and all the products and by-products resulting from the conversion of the body or of parts of the body of hot-blooded animals. By meat is meant, in particular, the meat of chicken, rabbits, cattle or sheep, and offal. By offal is meant both lung lobes and livers or kidneys. By meat by-products is meant the meal obtained from carcasses of the aforementioned animals. In the present description, fish and fish by-products are regarded as included in the definition of meat and meat by-products. By fish and fish by-products are meant fish or parts of fish, in the fresh state or preserved by a suitable treatment, as well as the byproducts of their conversion. Salmon or sardines may be used as fish, and fish meal may be used as by-products.

Meat and meat by-products are used at a content of between 0.1 and 50%. In the mixture obtained, it is this fraction which is the most expensive and which is therefore important to reduce.

By cereals are meant all species of cereals, whatever their presentation, or the products obtained by the conversion of the floury portion of the cereals. It is preferable to use corn, maize, soya or rice, as well as their flour. This definition also encompasses plant-origin by-products and plant-protein extracts. By plant-origin by-products is meant the by-products resulting from the treatment of plant products, in particular cereals, vegetables, pulses and oilseeds. By plant-protein extract is meant all plant-origin products whose proteins have been concentrated by a suitable treatment.

The fat used is an oil or an animal or vegetable fat. It is present in the mixture in an amount of from 0.1 to 25%. The water content of the base mixture is between 50 and 70%.

According to the invention, it is possible to manufacture pieces having various colours. Injection of the colouring solution takes place while the base mixture is passing through the emulsifying device. A time t is thus provided for injecting a first colorant in order to colour a mass m, then the supply of this colorant is cut off and a second colorant is supplied for a time t in order to colour a new mass m, and so on, depending on the number of colouring solutions provided. According to the process of the invention, two or three colouring solutions are preferably provided. The type of colorant used is not critical, all that is required is that the colourant be compatible with a food. One of the colorants is, for example, haemoglobin. The colorant addition time t between 0.1 and 600 seconds and is is preferably between 0.1 and 300 seconds. The amount of colouring solution is not and may be between 0.1 and 12%, preferably between 2 and 4%.

The paste thus coloured is taken to a distribution valve which, in the case of two colorants, has two outlets. As illustrated in the drawing Figures and described further below, when a paste with colorant is supplied, a mechanical extruder is fed from one distribution valve outlet, and when a paste with another colorant is supplied, the distribution valve switches over so that a second outlet is opened to feed a second mechanical extruder. Of course, there must be a link between the distribution valve and the system for controlling the colouring solution, and when the colouring solution is changed, the output valve is switched over to the other mechanical extruder. The explanation is similar if, instead of two colouring solutions, there are three.

The mechanical extruders should never be empty to that the paste may thus be extruded simultaneously from the various extruders onto the conveyor belt of a steam oven. During this extrusion, the various mechanical extruders are recharged upstream, one after the other, depending on the colouring solution injected into the emulsifying device.

Calling t the time during which a colorant is injected into the emulsifying device and calling n the number of colouring solutions, and therefore the number of mechanical extruders, the time to empty each extruder completely should be at least equal to (n−1)t.

The coloured paste is extruded onto the conveyor belt in the form of pieces having a size of between 0.1 and 20 mm. The pieces are then cooked at a temperature of between 80 and 100° C.

The pieces thus obtained have a moisture content of between 50 and 70%. They are cut up and used in a moist formulation with sauces, vegetables, rice or pasta.

with the combination of apparatus components described above, it is also possible to use, after the mixer, a holding tank to allow good control of the flow rate and continuous manufacture of the pieces. Preferably, the pump is a stuffer allowing the emulsifying device to be fed directly at a constant and adjustable flow rate.

The emulsifying device is not critical. Preferably, it is of a device of the KARL SCHNELL or type. Pipes for the colouring solutions enter the emulsifying device. Injection of each of these colouring solutions is controlled by a valve.

The distribution valve is placed as close as possible to the emulsifying device and allows complete separation of the various coloured products.

If the paste is coloured using two colorants, a three-way valve and two mechanical extruders are used. If the paste is coloured using three colorants, two three-way valves in series and three mechanical extruders are used.

BRIEF DESCRIPTION OF THE DRAWING FIGURE

The drawing FIGURE of this application diagrammatically illustrates an apparatus assembly for carrying out the process of the invention to obtain two differently colored products.

DETAILED DESCRIPTION OF THE DRAWING FIGURE

The various ingredients, such as meat, cereals, water and fat, are mixed in the mixer (1). The outlet pipes (20) of the mixer feed a storage tank (2). The pumps (3) allow the mixture obtained to be taken continuously via the pipes (4) to a stuffer (5).

The device furthermore comprises an emulsifying device (7), two colouring-solution storage tanks (10) and (21), a three-way valve (11), two mechanical extruders (14) and (15) and a steam oven (16).

In operation the stuffer (5) feeds the emulsifying device (7) via the line (6). The mixture is emulsified and coloured. To do this, the valve (22) opens the storage tank (21) for colouring solution 1 so that the solution flows via the pipe (8) and enters the emulsifying device. The valve (22) is left open for a period of 180 seconds and the paste thus coloured is conducted via the pipe (19) to the outlet (23) of the three-way valve (11) so as to feed the mechanical extruder (15) via the pipe (13). This extruder has a die (25) through which the paste passes in order to form pieces which drop onto the conveyor belt (17) of the steam oven (16). This oven has a cooking tunnel (18) and cooks the pieces at a temperature of 85° C. in a time of 90 seconds.

After the 180 seconds, the valve (22) is closed, and it is the valve (9) which is opened, so that colouring solution 2 from the tank (10) enters the emulsifying device (7) via the pipe (8). A link between the valves (22) and (9) and the three-way valve (11) allows the valve (11) to then be switched to the outlet (24). The paste then passes via the pipe (12) to the mechanical extruder (14) and via the die (26) so as to output pieces which are also cooked in the steam oven (16). The pieces which emerge have a moisture content of 56%.

As is described above and in the drawing FIGURE, each pipe, or piping line as recited in the claims below, which transports the paste, or emulsified product as recited in the claims below, from the emulsifying device for feeding the extruders is connected into one extruder and the plurality of piping lines and extruders are arranged, as is characterized in the art, as being arranged in parallel, and the distribution valve is configured and operates so that the emulsified product from the emulsifying device is distributed to the emulsified product transport piping lines so that when emulsified product is distributed to one product transport piping line, emulsified product is not delivered to another of the product transport piping lines.

As already mentioned above, the object of the present invention is to be able to produce in a continuous fashion pieces having two colours simultaneously. The mechanical extruders (14) and (15) must therefore never be empty. For this purpose, a link is provided between the level in the hoppers of the extruders and the output of the stuffer (5) and if the level is too low the output of the stuffer is increased, and if the level is too high, the output of the pump is decreased.

Of course, the output of the stuffer is directly related to the output of the steam oven.

It is possible, according to the invention, to provide simultaneous production with more than two colours. However, in reality it is difficult to exceed 4 colours.

The rest of the description is given with reference to the example set forth below.

EXAMPLE

A paste is made which is composed of 65% of meat and ground meat by-products, 25% of cereal and 10% of water and vitamin supplements. The paste is transferred to a Karl Schnell line emulsifying device by means of a transfer pump. 3% of colouring solution is injected into the emulsifying device so as to obtain internal mixing between the paste and the colouring solution, for a time t which is determined depending on the conditions for filling and emptying the mechanical extruders and on their output, which is fixed at 3500 kg/h. The filling height in the hopper of the extruders is 0.8 m. The time to empty and fill the said hopper, and the colouring-solution injection time, is 288 s. The rate of colorant injection is therefore fixed at 3% of 3500 kg/h, i.e. 105 kg/h.

What is claimed is:

1. Apparatus for preparing a extruded food product comprising:

a mixer for mixing food materials to prepare a base material mixture which is emulsifiable;

a device for emulsifying the base material mixture to obtain an emulsified product and which comprises means for solutions, including food-coloring solutions, to enter into the device for preparation of the emulsified product;

a pump and a plurality of piping lines wherein the mixer, pump and emulsifying device are arranged in series and connected by the piping lines so that the pump receives the base mixture and pumps the base mixture to the emulsifying device;

a plurality of tanks and a plurality of piping lines arranged in parallel so that one piping line is connected with each tank and so that each piping line is connected with the emulsifying device entering means for supplying the solutions to the emulsifying device;

a plurality of valves arranged so that one valve is positioned with respect to each tank and solution piping line and configured so that the valves are openable and closable for controlling the supplying of the solutions from the tanks to the emulsifying device;

a plurality of piping lines arranged in parallel for transporting emulsified product;

a valve which is positioned with respect to the emulsifying device and the product transport piping lines for receiving emulsified product prepared by the emulsifying device and which is configured so that the emulsified product is distributed to the product transport piping lines so that when emulsified product is distributed to one product transport piping line, emulsified product is not delivered to another of the product transport piping lines;

a plurality of mechanical extruders connected to the plurality of product transport piping lines so that each extruder is connected to one of the product transport piping lines for receiving emulsified product for extruding the product through a die to obtain an extruded product;

a steam oven for cooking the extruded product; and a conveyor belt positioned for receiving the extruded product from the extruders and for conveying the extruded product through the oven for the cooking.

2. Apparatus according to claim 1 wherein the valve for distributing the emulsified product is a three-way valve.

3. Apparatus according to claim 1 or 2 wherein there are two parallel product transport piping lines and two mechanical extruders.

4. Apparatus according to claim 3 wherein there are two tanks and wherein there are two parallel piping lines which separately connect the two tanks with the emulsifying device.

5. Apparatus according to claim 1 further comprising a second valve for receiving and distributing emulsified product to the product transport piping lines and which is arranged in series with the valve for distributing the emulsified product.

6. Apparatus according to claim 5 wherein the valves in series for distributing the emulsified product are three-way valves.

7. Apparatus according to claim 5 or 6 wherein there are three parallel product transport piping lines and three mechanical extruders.

8. Apparatus according to claim 7 wherein there are three tanks and wherein there are three parallel piping lines which separately connect the three tanks to the emulsifying device.

9. Apparatus according to claim 1 further comprising a tank for holding the base mixture and further comprising piping lines connected to the tank, wherein the tank is arranged in series between the mixer and the pump and the piping lines connect the tank with the mixer and the pump.

10. Apparatus according to claim 1 wherein the pump is adjustable for adjusting a flow rate of the base mixture to the emulsifying device.

11. Apparatus according to claim 1 or 10 further comprising a link between the solution control valves and the emulsified product distribution valve so that, at different times in operation, differing solutions are supplied to the emulsifying device and so that differing emulsified product is distributed to differing piping lines so that products which differ one from another are extruded onto the conveyor belt.

12. Apparatus for preparing an extruded food product comprising:

a mixer for mixing food materials to prepare a base material mixture which is emulsifiable;

a device for emulsifying the base material mixture and which comprises means for solutions, including food-coloring solutions, to enter into the device for preparation of the emulsified product;

a pump and a plurality of piping lines wherein the mixer, pump and emulsifying device are arranged in series and connected by the piping lines so that the pump receives the base mixture and pumps the base mixture to the emulsifying device;

a plurality of tanks and a plurality of piping lines arranged in parallel so that one piping line is connected with each tank and so that each piping line is connected with the emulsifying device entering means for supplying the solutions from the tanks to the emulsifying device;

a plurality of valves arranged so that one valve is positioned with respect to each tank and solution piping line and configured so that the valves are openable and closable for controlling the supplying of the solutions from the tanks to the emulsifying device;

a plurality of piping lines arranged in parallel for transporting emulsified product;

a valve which is positioned with respect to the emulsifying device and the product transport piping lines for receiving emulsified product prepared by the emulsifying device which is configured so that the emulsified product is distributed to the product transport piping lines so that when emulsified product is distributed to one product transport piping line, emulsified product is not delivered to another of the product transport piping lines; and a plurality of mechanical extruders connected to the plurality of product transport piping lines so that each extruder is connected to one of the product transport piping lines for receiving emulsified product for extruding the product through a die to obtain an extruded product.

13. Apparatus according to claim 12 further comprising a tank for holding the base mixture and further comprising piping lines connected to the tank, wherein the tank is arranged in series between the mixer and the pump and the piping lines connect the tank with the mixer and the pump.

14. Apparatus according to claim 12 wherein the pump is adjustable for adjusting a flow rate of the base mixture to the emulsifying device.

15. Apparatus according to claim 12 or 14 further comprising a link between the solution control valves and the emulsified product distribution valve so that, at different times in operation, differing solutions are supplied to the emulsifying device and so that differing colored emulsified product is distributed to differing piping lines so that products which differ one from another are extruded onto the conveyor belt.

* * * * *

UNITED STATES PATENT AND TRADEMARK OFFICE
CERTIFICATE OF CORRECTION

PATENT NO. : 6,145,433
DATED : November 14, 2000
INVENTOR(S) : Christope DUPONT

It is certified that error appears in the above-identified patent and that said Letters Patent is hereby corrected as shown below:

Column 3, line 10, after "t", insert -- is -- <u>and</u> then, at column 3, line 11, delete the second occurence of "is".

Column 3, line 27, delete "to" and insert therefor -- so --.

Column 3, line 52, after "or", insert -- TRIGONAL SIEFER --.

Column 5, line 14 (line 1 of claim 1), delete "a" and insert therefor -- an --.

Signed and Sealed this

First Day of May, 2001

*Attest:*

NICHOLAS P. GODICI

*Attesting Officer*   *Acting Director of the United States Patent and Trademark Office*